United States Patent [19]

Lugay et al.

[11] 4,089,978
[45] May 16, 1978

[54] PET FOOD ACCEPTABILITY ENHANCER

[75] Inventors: Joaquin Castro Lugay, Thornwood, N.Y.; Gerhard Julius Haas, Woodcliff Lake, N.J.; Robert James Beale, New Rochelle, N.Y.

[73] Assignee: General Foods Corporation, White Plains, N.Y.

[21] Appl. No.: 671,783

[22] Filed: Mar. 30, 1976

[51] Int. Cl.² ................................................ A23K 1/04
[52] U.S. Cl. ........................................ 426/32; 426/33; 426/60; 426/62; 426/89; 426/533; 426/805
[58] Field of Search .................. 426/33, 62, 32, 56, 426/89, 92, 94, 99, 293, 295, 302, 303, 307, 310, 533, 807, 63, 60, 2, 805, 646, 647

[56] References Cited

U.S. PATENT DOCUMENTS 3,653,908   4/1972   Buck et al. .......................... 426/332
3,857,968   12/1974   Haas et al. .......................... 426/805

*Primary Examiner*—R. B. Penland
*Attorney, Agent, or Firm*—T. J. Carvis; D. J. Donovan; B. P. Struzzi

[57] ABSTRACT

The palatability of animal foods is increased by incorporating therein an effective amount of a palatability improving composition prepared by reacting an aqueous mixture of a reducing sugar, animal blood, yeast and fat with lipase and protease, preferably as a mixture such as pancreatic lipase, at moderate temperature and then heating the resulting mixture to an elevated temperature to more fully develop the flavor and inactivate the enzymes. This palatability improving composition is preferably incorporated into an animal food, such as a nutritionally balanced dog food, by coating it thereon in an amount effective to increase the palatability of the animal food.

7 Claims, No Drawings

PET FOOD ACCEPTABILITY ENHANCER

BACKGROUND OF THE INVENTION

The present invention relates to animal foods, and more particularly, to methods for producing animal foods having increased palatability.

There is a continuing effort being made to develop processes and formulations which permit increasing the palatability of animal foods while maintaining their nutritional value. The development and production of nutritious animal foods has posed few problems to the art. It is essential, however, to make these formulations sufficiently palatable that the animals eat them in the amounts required for proper nutrition.

Representative of efforts to increase pet food palatability is the disclosure in U.S. Pat. No. 3,653,908, wherein M. E. Buck et al disclosed an intermediate-moisture feline food. According to that invention a stable animal food having a moisture content of 35–45% was prepared by pasteurizing and emulsifying an aqueous meat slurry; adding thereto about 5–20% of an ungelatinized amylaceous flour and stabilizing solutes such as sugar at a level exceeding 10%, salt and sufficient acidulants to obtain a pH of from about 4 to 6; and extrusion cooking the resulting composition. According to one aspect of that invention, it was suggested that Torula yeast and protein concentrates such as sodium caseinate or bovine blood be added along with the dry ingredients after emulsification and pasteurization at elevated temperature. The patent suggests adding sufficient acid prior to the emulsification or pasteurization step such that partial denaturation of the meat constituents will occur. Alternatively, the reference suggests the addition of alkali for this same purpose or the use of proteolytic enzymes. Although this reference mentions the potential use of yeast, reducing sugars, fat, and animal blood at various stages in the preparation of the animal food, it is not recognized that a palatability improving composition can be prepared by employing these ingredients along with the appropriate enzymes at moderate temperatures to effect an enzymatic reaction and then heating only after completion of the enzymatic reaction to inactivate the enzymes and to more fully develop the flavorful compounds.

In another recent effort, G. J. Haas et al disclosed in U.S. Pat. No. 3,857,968, that a palatability improving composition for animal foods can be prepared by reacting an aqueous mixture of protein and emulsified fat with lipase and protease. This disclosure, however, does not teach the unique characteristics which can be obtained through the use of fat, animal blood and yeast in combination with reducing sugars.

Thus, while many workers suggest the production or enhancement of flavorful animal foods for purposes of animal palatability, consumer contentment and manufacturing economy, there remains a vast need for improved and alternative compositions if only for the sake of providing a variety of flavorful compositions which will have the net overall effect of increasing consumption of the foods by pets.

SUMMARY OF THE INVENTION

Accordingly, it is an object of the present invention to provide an animal food of improved palatability.

It is a further object of the present invention to provide a process for improving the palatability of animal foods.

These and other objects are accomplished according to the present invention by incorporating into an animal food an effective amount of a palatability improving composition prepared by reacting an aqueous mixture comprising reducing sugar, blood, yeast, and fat with lipase and protease at moderate temperatures and then elevating the temperature for a period of time sufficient to more fully develop the flavor and inactivate the enzymes.

DETAILED DESCRIPTION

The palatability improving composition of the present invention is presently believed to produce a wide variety of reaction products. At the present time no single one of these reaction products is identified as being the predominant source of the palatability improvement. To the contrary, it is believed that the complex array of flavor and aroma components present in the mixture, from the most tart and pungent to the most subtle and savory, are sensed individually and collectively, and integrated and differentiated by the unique taste and smell sensory systems of the animals. Whatever the exact cause for the improved palatability may be, applicants herein set forth a method for obtaining, and a product having, improved palatability. The improvement pertains to animal foods generally, and especially to nutritionally balanced dog and cat foods. The preferred embodiment of the present invention is directed toward the preparation of dog foods.

The palatability improving compositions of the present invention can be incorporated into the animal food in any suitable manner. Thus, where the complete animal food, or any portion thereof, contains all of the necessary reactants, the palatability improving composition can be incorporated into the animal food by producing it in situ. Alternatively, and preferably, the palatability improving composition can be prepared separately from the remainder of the animal food and then mixed with or applied to the animal food. These procedures will be discussed in more detail below.

As set forth above, the palatability improving composition is prepared by first enzymatically reacting an aqueous mixture comprising reducing sugar, animal blood, yeast and fat with lipase and protease at moderate temperature and then increasing the temperature to more fully develop the flavor and inactivate the enzymes. Preferably, because the reaction between the enzymes and the fat is heterogeneous, taking place at the fat-water interface, it is desirable to first emulsify the fat portion. Emulsification can be obtained through the addition of an emulsifier; or, as in the case where the reaction mixture comprises a sufficiently functional protein material, the addition of a supplemental non-proteinaceous emulsifier can be omitted. Where, however, a non-proteinaceous emulsifier is employed, it is typically employed in amounts of up to about 20% by weight based upon the weight of the fat. Typical of the non-proteinaceous emulsifiers which can be employed are sodium stearoyl-2-lactylate, lecithin, mono-and di-glycerides, succinoylated monogylcerides, gum arabic and sodium alginate.

In order to most sufficiently prepare the emulsified fat portion of the reaction mixture, the fat is admixed with the water in liquid form with sufficient proteinaceous or non-proteinaceous emulsifiers. The fat can be a normally solid or plastic fat, but in this case, it should be melted to the liquid state before emulsification. The relative amounts of fat and water necessary for the reaction are not presently considered critical, but are desirably present at a fat to water ratio of from about 1:100 to 10:1 and preferably from about 1:4 to 1:1. Vigorous agitation can be advantageously employed to effect emulsification, but, where the enzyme is added prior to emulsification, care should be taken to avoid such violent agitation that the enzyme is reduced in activity.

The other constituents of the reaction mixture can be added either before or after emulsification, but are preferably added prior to emulsification as the proteinaceous components aid in forming and stabilizing the emulsion. The reaction mixture also preferably contains promoter salts such as calcium chloride and sodium chloride.

To develop the flavorful compounds present in the palatability improving composition of the present invention, it is necessary to react the mixture with both lipolytic and proteolytic enzymes, preferably as a mixture. Pancreatic lipase either purified or in the form of macerated pancreas, is a suitable enzyme source. A preferred enzyme form is pancreatic lipase containing from about 20 to 250 lipase units per gram and from about 500 to 7000 protease units per gram. A lipase unit is defined as that amount of the enzyme which will hydrolyze 0.885 grams of olive oil calculated as triolein to diolen and oleic acid in 2 hours at 37° C. A protease unit is defined as that amount of the enzyme which will digest one mg. of casein in one minute at 50° C at pH 7.5. Pancreatic lipase containing about 200 lipase units per gram and about 6000 protease units per gram, is a particularly preferred enzyme mixture. The exact activity which can suitably be employed, is not presently considered critical as long as the enzymes are present in amounts effective under desired reaction conditions, to cause an enzymatic reaction resulting in the production of the palatability improving composition. The enzymes can be admixed with the reaction mixture at any time before, during, or after emulsification. Admixture after emulsification is, however, preferred. In the case of pancreatic lipase it is typically employed in amounts sufficient to supply from about 20 to 250 lipase units and about 500 to 7000 protease units per 100 grams fat. Should it be desired, the enzymes can be added and reacted sequentially.

The fats employed in preparing the palatability improving composition according to the present invention are preferably animal fats such as those naturally present in meats, tallow, chicken fat, butter oil, and lard. It is noted, however, that many vegetable fats will also provide desirable results. Presently, butter fat and bleachable fancy tallow are preferred. It will be apparent to those skilled in the art that fats and oils which, naturally or after processing according to the present invention, are unpalatable to animals, are not preferred according to the present invention.

The reaction mixture for preparing the palatability improving composition of the present invention also essentially includes at least one reducing sugar. Reducing sugars are those that will reduce Fehling's solution or similar test liquids, with conversion of blue soluble copper salt to a red, orange or yellow precipitate of Cuprous oxide. Glucose, maltose, ribose, xylose, fructose and galactose are typical examples of reducing sugars. Characteristically, the reducing sugar molecules contain an aldehyde or keto group that is the basis for this type of reaction. The role which the reducing sugar plays in the enzymatic reaction is at present unidentified; however, it is believed that they react with free amino acids in the reaction product of the enzymatic reaction under heat to produce compounds flavorful to animals. The reducing sugars are typically employed at concentrations of from about 0.1 to about 10% based upon the weight of the fat present in the reaction mixture.

Further essential in the reaction mixture for preparing the palatability improving composition according to the present invention is the presence of animal blood. The blood is preferably derived from warm-blooded land animals such as cows, pigs, sheep, chicken and the like. The physical state of the blood is not presently known to be critical. Thus, either dried or fresh whole blood is suitable. Furthermore, it is not believed to be important as to whether or not the blood is defibrinogenated. The blood is typically employed in amounts providing from about 5 to about 50 weight percent dry solids based upon the weight of the fat employed in the composition. While the blood provides a flavor all its own and independently palatable to the animal food, its contribution to the overall palatability of the composition of the present invention is derived in large part through the enzymatic reaction and subsequent flavor-developing heating step.

The use of yeast or yeast extract in the reaction mixture for preparing the palatability improving composition of the present invention is also thought to be essential. And, like the fat and blood components, the particular source of yeast is not known to be significant. Thus, many types of yeast such as brewers yeast, Candida utilis, bakers yeast and Saccharoyces fragilis employed either as live yeast, dried yeast solids or extracts would be suitable. The yeast is preferably employed in amounts ranging from about 1 to about 25% based upon the weight of the fat employed in the composition. Like the blood, the yeast imparts its own characteristic flavor and aroma to the composition of the present invention independent of any reaction involving it. However, its participation in the overall flavor development through enzymatic reaction and subsequent heat treatment is believed essential to the improvement in palatability derived according to the present invention.

As indicated above, the reaction mixture components are blended together either simultaneously or sequentially with simultaneous addition being preferred, followed by emulsification of the fat in the water. After emulsification, the enzymatic reaction is allowed to progress at moderate temperatures. Typically, temperatures within the range of from about 30° to about 55° C are effective for actively maintaining the reaction. This temperature range is, therefore, preferred; however, any reaction temperature effective to sustain the enzymatic reaction resulting in the production of the palatability improving composition can be employed. Thus, it is noted that lower temperatures (e.g. 5° to 25° C) can be employed with somewhat diminished results due to reduced reaction rates. Also, somewhat higher temperatures (e.g. 55° C to 60° C) can be employed but are generally more costly than the increased reaction rates will justify. Desirably, the reaction mixture is continuously stirred throughout the period of reaction to maintain a desirably high rate of reaction. It is necessary, however, only to provide that minimum degree of stirring which will provide constant and efficient reaction. The enzymatic reaction will be continued for a period of time effective to sustain the enzymatic reaction resulting in the production of the palatability improving composition. Generally, it will be continued for a period of time ranging from about 5 minutes to 16 hours, typically from about 15 minutes to 2 hours. It is of course possible, by varying the reaction conditions and the concentrations of the various reactants, to obtain suitably effective reaction rates and degrees of reaction outside these time limitations.

The pH of the reaction mixture controls the enzymatic reaction and should be monitored and adjusted to the extent necessary to provide the desired result. Various enzymes will provide their optimum reactivities at various different pH's. It is necessary, then, for a specific enzyme to establish that pH or pH-time profile which is most favorable to the enzyme being used. Typically, in the case of pancreatic lipase, the pH is adjusted periodically to bring it within the range of from about 4 to 10, preferably from about 6 to 9, and most preferably from about 8.0 to 8.5.

After the desired period of reaction, the reaction mixture is heated at elevated temperatures, typically on the order of 70° to about 95° C. This heating step is essential. The heating provides a two fold effect: first, it more fully develops the flavor and aroma of a palatability improving composition due to complex reactions occuring between the various reaction products and unreacted starting materials; and secondly, it inactivates the enzymes so that the final product quality can be more easily controlled. While these temperatures are believed preferred, any temperature effective to both inactivate the enzymes employed and develop the flavor of the palatability improving composition to the extent that its application to an animal food, especially a dog food, results in an enhanced palatability is sufficient. Typically, while any period of time which is effective for producing these desired results would be suitable, it has been found that times in the order of from about 5 to about 15 minutes are preferred.

This palatability improving composition is preferably maintained in the emulsified state for incorporation into the animal food. The emulsion can, if desired, be cooled or frozen and stored for extended periods of time.

The palatability improving composition can be incorporated into the animal food in any suitable manner. Application by spraying is particularly preferred for dry animal foods because it allows uniform surface application without breaking the emulsion. This makes it possible to obtain improved palatability with significantly smaller amounts of the palatability improving composition. Typical of a suitable device for spraying the emulsion onto the animal food is a spray gun of the kind commonly employed in paint spraying. While the fat to water ratio of the emulsion is not believed critical during application of the emulsion to the animal food, it generally ranges from about 1:5 to about 1:1, and is typically about 1:4. Where it is desired that the animal food have an outer coating of an unconditioned fat along with the palatability improving composition, the two materials can be applied sequentially or simultaneously. Preferably, the unconditioned fat is applied first, and the palatability improving composition is applied thereover. The animal food can be dried after incorporation of the palatability improving composition to reduce the moisture content to the desired level.

The palatability improving compositon prepared in this manner is generally applied in any amount effective to increase the preference by the animal for the treated food versus a non treated food. Typically, amounts as low as about 1% by weight based on the total weight of the food will provide significant improvement in palatability for dogs. For reasons of economics, amounts of greater than about 5% by weight of the animal food are not employed. However, such high weights can be employed where they are dispersed throughout the total animal food composition. It is thus possible according to the present invention to either increase the palatability of a present animal food formulation, or to obtain the same palatability as a present formulation while using less expensive, albeit less palatable, ingredients in the animal food formulation.

According to one embodiment of the present invention, the reaction mixture, in addition to containing the essential blood, yeast and reducing sugar components according to the present invention, employs a meat slurry containing fat to provide the fat component of the reaction mixture. In this embodiment, the meat slurry and the other ingredients are vigorously agitated to obtain emulsification of the fat and then reacted as set forth previously. According to this embodiment, because the reaction mixture is diluted due to the presence of meat, a greater proportion of this material should be employed in the final animal food product. In the limited embodiment where this meat slurry would be a portion of a soft moist product wherein the palatability improving composition would be intimately co-mixed with the other ingredients of the animal food as opposed to being coated on the surface, it should be employed at levels of from about 1% to about 35%, and preferable from about 5% to about 30%, based on the weight of the animal food. It is noted as a guideline to an upper limit, that where the meat slurry is the normal component of a soft-moist animal food composition, the enzymatic reaction on the meat tends to affect the texture; and, excessively high concentrations of meat slurry treated in accordance with the present invention should be avoided where the impairment of the texture outweighs the improvement to palatability gained according to the present process.

While the palatability improving compositions prepared according to the present invention can improve the palatability of animal foods generally, they are especially suitable for use with nutritionally balanced foods comprising protein, fat, carbohydrates, vitamins and minerals. Particularly significant and dramatic increases in palatability are provided to dry animal foods of the type described in U.S. Pat. No. 3,365,297 to H. M. Burgess et al., and intermediate-moisture animal foods such as those described in U.S. Pat. Nos. 3,202,514, 3,482,985 and 3,615,652 to H. M. Burgess et al., and U.S. Pat No. 3,623,884 to G. J. Haas. High moisture or canned type animal foods can also be successfully treated according to the present invention. The disclosures relating to these animal food formulations in the abovementioned patents are incorporated by reference.

The following example is presented for the purpose of further illustrating and explaining the present invention and is not to be taken as limiting in any sense. Unless otherwise indicated, all parts and percentages are by weight.

EXAMPLE

This example describes what is presently believed to be the best mode for carrying out the invention. The following materials were mixed and then emulsified for 3 minutes with a Tekmar emulsifier set on position number 9:

| Component | Amount | |
| --- | --- | --- |
| Sodium Chloride | 22.9 | grams |
| Calcium Chloride Dihydrate | 0.8 | grams |
| Glucose | 22.7 | grams |
| Water | 454.0 | grams |
| Dried Animal Blood | 45.4 | grams |
| Yeast Extract | 45.4 | grams |
| Bleachable Fancy Tallow | 454.0 | grams |

The emulsified mixture is then heated in an autoclave at 15 psig for 15 minutes. To the resulting product is added 450 mls of a solution containing 0.4M NaCl and 0.005M CaCl$_2$. The resulting mixture is then reemulsified, its pH is adjusted to 8.5 with 2N sodium hydroxide, and is then placed in a 50° C water bath. To this heated reaction mixture is then added 1% pancreatic lipase based upon the weight of the bleachable fancy tallow. The reaction is allowed to progress for 2 hours with adjustment of the pH back to 8.0 every 30 minutes. Before final pH adjustment at 120 minutes, the reaction mixture is heated in an autoclave at 15 psig for 20 minutes to fully develop the flavor and aroma of the composition and to inactivate the enzymes. The resulting palatability improving composition is then applied to a commercially available, granular, dry dog food having a coating amounting to 3% by weight of bleachable fancy tallow, a moisture content of 9% and having the following dry basis formulation: 40.4% corn; 23.1% soya meal; 20.8% wheat midlings; 11.6% of 50% meat meal, and 4.1% vitamin, mineral, dye and flavoring mix. The palatability improving composition is applied as an emulsion containing about 20% solids and is sprayed onto the animal food by means of a spray gun into a cement mixer containing the dry food to provide a palatability improving composition content of about 1% by weight of the animal food. The animal food is then dried by heating for from 5 to 10 minutes at 90°–110° C to reduce the final moisture content of the dog food to about 8–12%. To provide a comparison between the dog food so treated and a control dog food, the above prepared dog food is offered to dogs simultaneously with an equal quantity of the same dog food but containing no palatability improving composition and an additional 1% of bleachable fancy tallow. Forty purebred beagles are fed the two foods; and their relative preferences, based on relative consumption of the two foods, are recorded and objectively compared. The dog food treated according to the present invention is strongly preferred over the control.

Many modifications and variations of the present invention will become apparent to those skilled in the art upon reading the above disclosure. It is intended that all such modifications and variations be included within the scope of the present invention which is defined by the following claims.

What is claimed is:

1. A method for increasing the palatability of a nutritionally balanced dry dog food, which comprises:
    (a) reacting an aqueous mixture of a reducing sugar, animal blood, fat, yeast or yeast extract with lipase and protease, at a temperature, pH, and for a time effective to cause lipolytic and proteolytic reaction;
    (b) heating the resulting aqueous reaction mixture to a temperature and for a time effective to inactivate the enzymes and to also further develop the palatability of the mixture, to produce a palatability enhancer;
    and (c) applying an external coating of the palatability enhancer onto a dog food in an amount, between 1% and 5% based on the total weight of the dog food, which is effective to increase the palatability thereof.

2. A method according to claim 1 wherein the fat is tallow.

3. A method according to claim 1 wherein the blood is liquid whole blood.

4. A method according to claim 1 wherein the blood is dried whole blood.

5. A method according to claim 1 wherein the lipase and protease are employed as pancreatic lipase.

6. A method according to claim 1 wherein the fat is emulsified in the water prior to the heating of step (b).

7. A method according to claim 1 wherein the reacting of step (a) is conducted for a time of from about 15 minutes to 2 hours at a temperature of from about 30° C to about 55° C.

* * * * *